United States Patent
Conflitti et al.

(10) Patent No.: US 6,266,844 B1
(45) Date of Patent: Jul. 31, 2001

(54) VEHICLE WINDSHIELD WIPER ASSEMBLY INCORPORATING CABLE AND PULLEY DRIVE SYSTEM AND REMOTE POSITIONED ELECTRIC MOTOR

(75) Inventors: Mary Conflitti; Robert Schank, both of Sterling Hts., MI (US)

(73) Assignee: Norwood Enterprises, LLC, Sterling Heights, MI (US)

( * ) Notice: Subject to any disclaimer, the term of this patent is extended or adjusted under 35 U.S.C. 154(b) by 0 days.

(21) Appl. No.: 09/394,492

(22) Filed: Sep. 13, 1999

(51) Int. Cl.[7] ................ B60S 1/20; B60S 1/26
(52) U.S. Cl. ........... 15/250.25; 15/250.3; 15/250.27; 74/37; 74/43; 74/96; 74/500.5
(58) Field of Search ............... 15/250.24, 250.25, 15/250.27, 250.29, 250.3; 74/500.5, 501.5 R, 502.4, 502.5, 37, 43, 96

(56) References Cited

U.S. PATENT DOCUMENTS

| | | | |
|---|---|---|---|
| 2,431,570 | * 11/1947 | Landon | 15/250.3 |
| 2,568,922 | * 9/1951 | Malone | 15/250.25 |
| 2,995,766 | * 8/1961 | Kuhn | 15/250.25 |
| 3,788,681 | 1/1974 | Barenyi et al. | 15/250.31 |
| 3,842,460 | * 10/1974 | Wulf | 15/250.27 |
| 4,418,440 | 12/1983 | Sigety, Jr. | 15/250.21 |
| 4,783,876 | 11/1988 | Souma et al. | 15/250.21 |
| 4,898,046 | * 2/1990 | Mancewicz et al. | 74/502.5 |
| 4,938,526 | 7/1990 | Sannomiya et al. | 15/250.27 |
| 5,068,942 | 12/1991 | Vrettos | 15/250.25 |
| 5,074,613 | 12/1991 | Unterborn et al. | 15/250.31 |
| 5,755,140 | 5/1998 | Turbessi et al. | 15/250.23 |

FOREIGN PATENT DOCUMENTS

| | | | | |
|---|---|---|---|---|
| 2155028 | * | 5/1973 | (DE) | 15/250.27 |
| 2312630 | * | 10/1974 | (DE) | 15/250.25 |
| 2130476 | * | 6/1984 | (GB) | 15/250.25 |
| 481141 | * | 5/1953 | (IT) | 15/250.25 |
| 197450 | * | 10/1985 | (JP) | 15/250.25 |
| 8-276825 | * | 10/1996 | (JP) | 15/250.25 |

\* cited by examiner

*Primary Examiner*—Gary K. Graham
(74) *Attorney, Agent, or Firm*—Gifford, Krass, Groh, Sprinkle, Anderson & Citkowski, P.C.

(57) ABSTRACT

A windshield wiper assembly for use in a motor vehicle. An electric motor is operatively connected to and powered by an on-board electrical supply provided by the vehicle. The motor forms a part of a housing mounted within an engine compartment of the vehicle at a location remote from the vehicles windshield. A driving wheel and linkage member convert a rotary output of the motor into a translating and reciprocating driving force. A drive mechanism is mounted proximate a lower edge of the windshield with a first wiper arm pivotally securing to the drive mechanism at a first location and a second wiper arm likewise pivotally securing to the drive mechanism at a second location. The drive mechanism provides a gear and belt arrangement for actuating the first and second wiper arms in a synchronous manner. One or more elongated and internally hollowed sleeves extend between the housing and the drive mechanism. Each sleeve encloses a flexible and incompressible cable securing to the motor and drive housing at a first end and to the drive mechanism at a second end. The cable is acted upon by the driving wheel and linkage of the housing and imparts the reciprocating and translating driving force to the gear and belt arrangement of the drive mechanism to operate the wiper arms and blades and so as to permit mounting of the motor and housing within the engine compartment at a location remote from the firewall separating the occupant compartment.

11 Claims, 3 Drawing Sheets

VEHICLE WINDSHIELD WIPER ASSEMBLY INCORPORATING CABLE AND PULLEY DRIVE SYSTEM AND REMOTE POSITIONED ELECTRIC MOTOR

BACKGROUND OF THE INVENTION

1. Field of the Invention

The present invention relates generally to windshield wiper assemblies and, more particularly, to a wiper assembly for use with a vehicle which incorporates a cable and pulley drive system and which permits positioning of the electric motor at a remote location from the interior cabin for driving the wiper assembly and for reducing cabin noise.

2. Description of the Prior Art

Standard vehicle windshield wiper assemblies are well known in the art. The purpose behind such assemblies, as is clearly evident, is to remove accumulations of rain, dirt or other impediments which would otherwise affect the ability of the driver to clearly view the area in front of the vehicle windshield.

One of the more well known prior art windshield wiper assemblies contemplates the use of an electric motor mounted in close proximity to a firewall of the vehicle and for operatively engaging a steel linkage arm. The linkage arm in turn engages first and second wiper arms at respective ends of the linkage arm and, responsive to the driving force of the motor, actuates the wiper arms in reciprocating fashion. The shortcomings of this conventional design are twofold. Firstly, the steel linkage arm can tend to deflect during operation, resulting in the respective wiper arms reciprocating in less than a desired synchronous manner. Secondly, the requirements of the mechanical linkage connection between the motor and the linkage arm are such that the motor must be mounted in fairly close proximity to the vehicle firewall and windshield; thus the sounds of the motor are clearly audible to the occupants within the vehicle.

Additional variants of prior art wiper assemblies are further illustrated in U.S. Pat. No. 5,755,140, issued to Turbessi et al., U.S. Pat. No. 4,418,440, issued to Sigety, Jr., and U.S. Pat. No. 5,068,942, issued to Vrettos. It is of interest to note that Turbessi teaches the use of a cable and lever arm arrangement for converting a motor output to a reciprocating driving force for the wiper arms. Vrettos is further interesting in that it teaches an endless belt positioned beneath a windshield and extending the width of the windshield. A wiper is attached to the belt on its inner side and the belt, when fully extended, defines an inner space large enough to accommodate the wiper.

SUMMARY OF THE PRESENT INVENTION

The present invention teaches a windshield wiper assembly for use in a motor vehicle, and which specifically provides the dual features of permitting remote mounting of the motor at a location distant from the vehicle firewall (and the vehicle occupant compartment), as well as for maintaining precise and synchronous movement of the first and second wiper arms. The positioning of the motor also increases the available space along the firewall for other automotive components. The vehicle includes an engine compartment which is capable of generating an on-board electrical power supply, an occupant compartment, and a windshield extending upwardly from a location contiguous the firewall separating the engine compartment and the occupant compartment.

Elements of the wiper assembly include an electric motor operatively connected to and powered by the on-board electrical supply. The motor forms a part of a housing mounted within the engine compartment at a location remote from the windshield, and typically to a sidewall defining portion of the vehicle's engine compartment. The housing including a driving wheel operatively engaged to the motor output and rotatable about a first shaft, the drive wheel in turn actuating an elongate and freely rotatably mounted linkage member. The linkage member engages at a remote end a driven member which is likewise rotatably mounted to the housing at a further location and along an axis of rotation parallel to an axis of rotation defined by the first shaft. The housing operates to convert an output of said motor into a reciprocating and translating driving force.

A drive mechanism is mounted proximate a lower edge of the windshield and includes an elongate body having a length, a width and a height. First and second gears are rotatably secured at first and second locations along the length of the drive mechanism. An elongate and closed loop timing belt is secured over the gears and, due to an interengaging and toothed arrangement of the gears and belt, the belt precisely rotates the second gear, responsive to rotation of the first gear, in a precise and synchronous manner. A first wiper arm pivotally secures to a first pin also mounting the first gear and a second wiper arm likewise pivotally secures to a second pin also mounting the second gear of the drive mechanism. Each of the first and second wiper arms further includes an elongate wiper blade which overlays and contacts an exterior face of the windshield;

At least one elongated and internally hollowed sleeve extends between the motor and drive housing and the wiper blade drive mechanism. A preferred embodiment teaches first and second sleeves each enclosing a flexible and incompressible cable securing to the housing at a first end and to the drive mechanism at a second end. The cables connect at respective locations to the driven member rotatably secured in the housing (either another wheel or a pivotally mounted and elongate plate) and respond by being translated internally in reciprocating fashion within the respectively mounted outer sleeves. The cables impart the reciprocating and translating driving force to a circular disk rotatably secured in coaxial fashion to the first gear of the drive mechanism to cause the first gear to rotate in reciprocating manner and, by virtue of the timing belt, to cause the second gear to identically actuate and to thereby operate the first and second wiper arms and blades in the desired synchronous manner.

BRIEF DESCRIPTION OF THE DRAWINGS

Reference will now be made to the attached drawings, when read in combination with the following specification, wherein like reference numerals refer to like parts throughout the several views, and in which.

DESCRIPTION OF THE PREFERRED EMBODIMENTS

Figure 1:
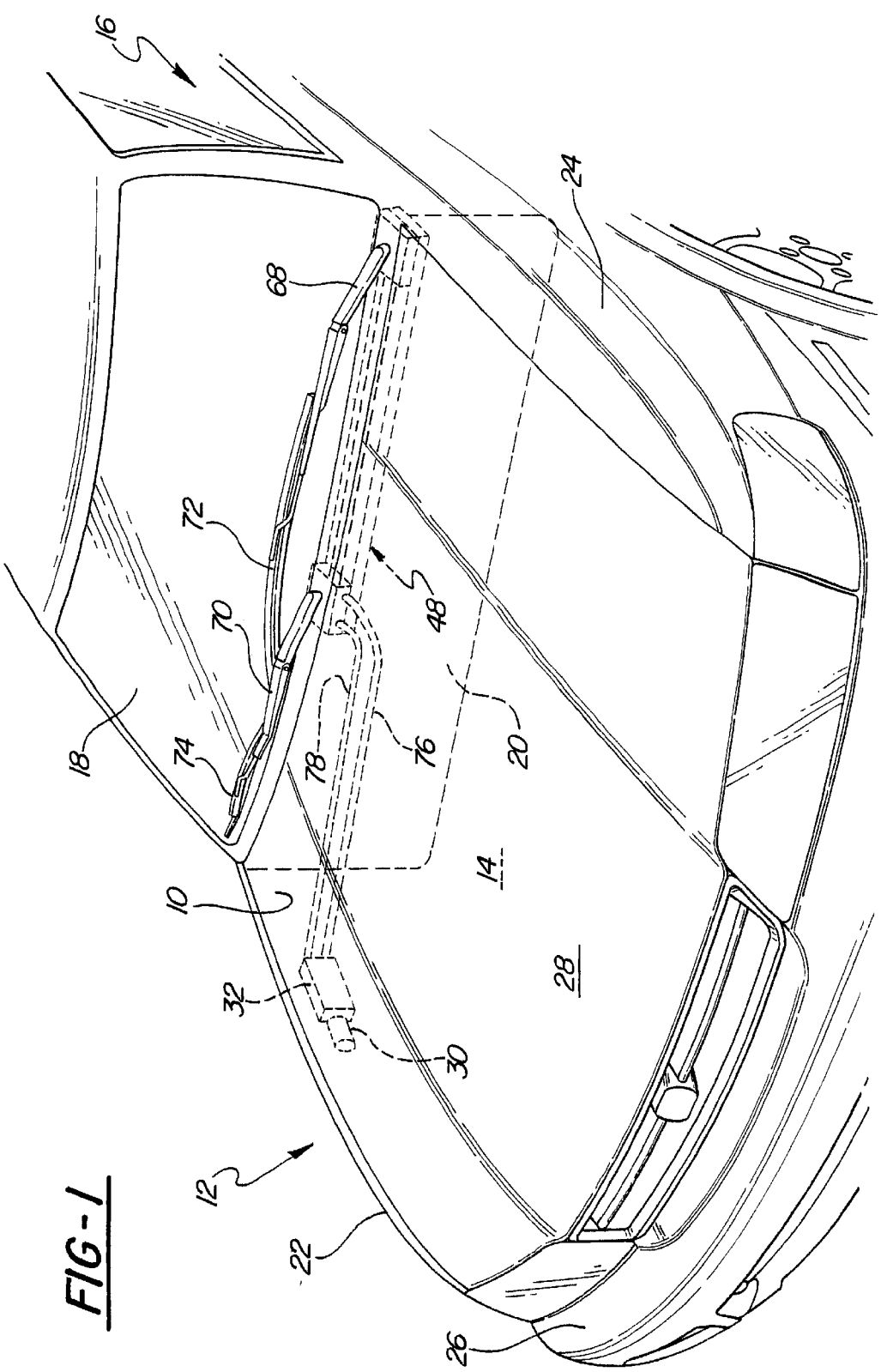
FIG. 1 is an operational view of a vehicle and illustration in phantom the location of the wiper assembly according to a first preferred embodiment of the present invention.

Referring to FIG. 1, an operational view of a windshield wiper assembly is shown in phantom at 10 for use in a vehicle 12 according to a first preferred embodiment of the present invention. The vehicle 12 is of conventional design and includes an engine compartment 14 which is capable of generating an onboard electrical power supply, such as by virtue of an alternator and battery, such elements being well known in the art and therefore not needing further explanation. The vehicle further includes an occupant compartment 16 and a windshield 18 extending upwardly from a location contiguous a firewall 20 separating the engine compartment 14 and the occupant compartment 16. The vehicle is further defined in part by first and second side walls 22 and 24 and a front bumper end 26. A hood 28 covers the engine compartment as also well known.

Figure 2:
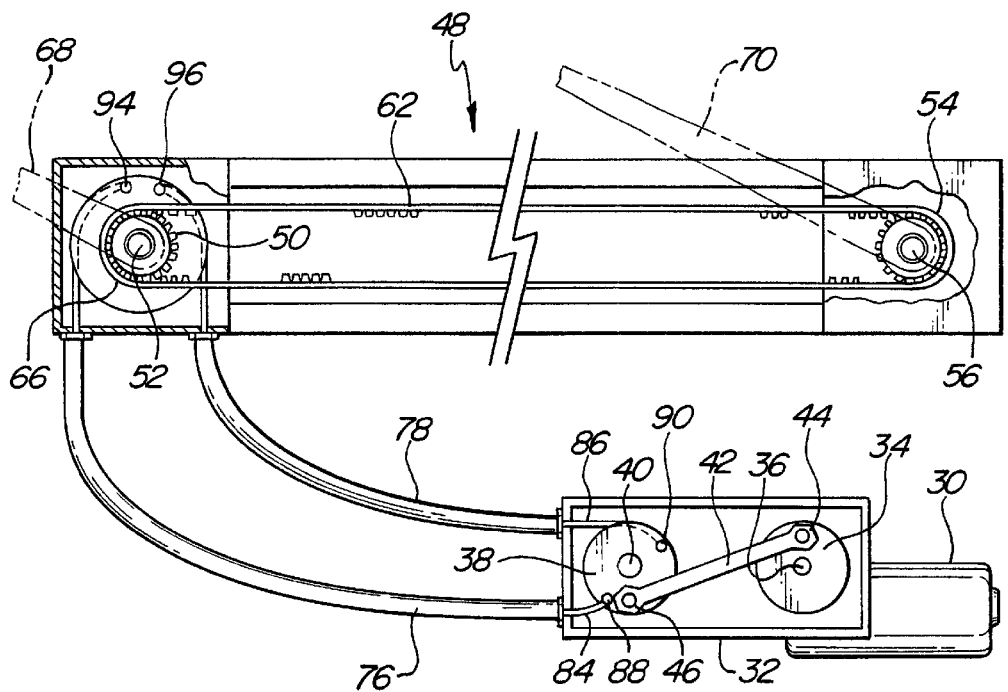
FIG. 2 is a view of the windshield wiper assembly according to the present invention and illustrating in cutaway a first preferred embodiment for generating the reciprocating and translational driving force from the motor and housing through the use of a pair of sleeve and cable members.

Referring again to FIG. 1, as well as to FIG. 2, an electric motor 30 is illustrated and which is understood to be operatively connected to and powered by the on-board electrical supply of the vehicle 12. The motor 30 forms a part of a housing 32 mounted within the engine compartment at a location remote from the windshield 18, such location being in one embodiment along an inner facing surface of the vehicle side wall 22. The motor is thus positioned at a location remote from the vehicle firewall and significantly increases the available space along the firewall. The housing 32 includes a conversion mechanism for converting an output of the motor 30 into a reciprocating and translating driving force.

Specifically, and referring to FIG. 2, a driving wheel 34 is operatively connected to the motor 30 and is rotatable about a first shaft 36. Although not shown in FIG. 2, it is understood that a traditional bevel gear arrangement or the like can be employed for transferring a rotary output from a shaft extending from the electric motor housing (also not shown) to the first shaft 36. A driven member 38 is rotatably mounted to said housing about a second shaft 40 a spaced location from the driving wheel 34 and the second shaft 40 defines an axis of rotation parallel to an axis of rotation defined by the first shaft 36. The driven member 38 according to the first embodiment is a second wheel however, as will be further described with the embodiment of FIG. 5, other types of driven members may be employed without departing from the scope of the instant invention.

An elongate linkage member 42 is rotatably mounted to an outer radial location 44 of the driving wheel 34 (such as through the use of a rotating bearing assembly or the like) at a first end and to a likewise outer radial location 46 of the driven member 38 at a second end. The linkage member 42 is actuated in a circular pattern resulting from the reciprocating motion imparted by the driving wheel 34 (itself in response to the actuation of the electric motor 30) and results in likewise rotating the driven member 38 or wheel in likewise fashion.

Figure 3:
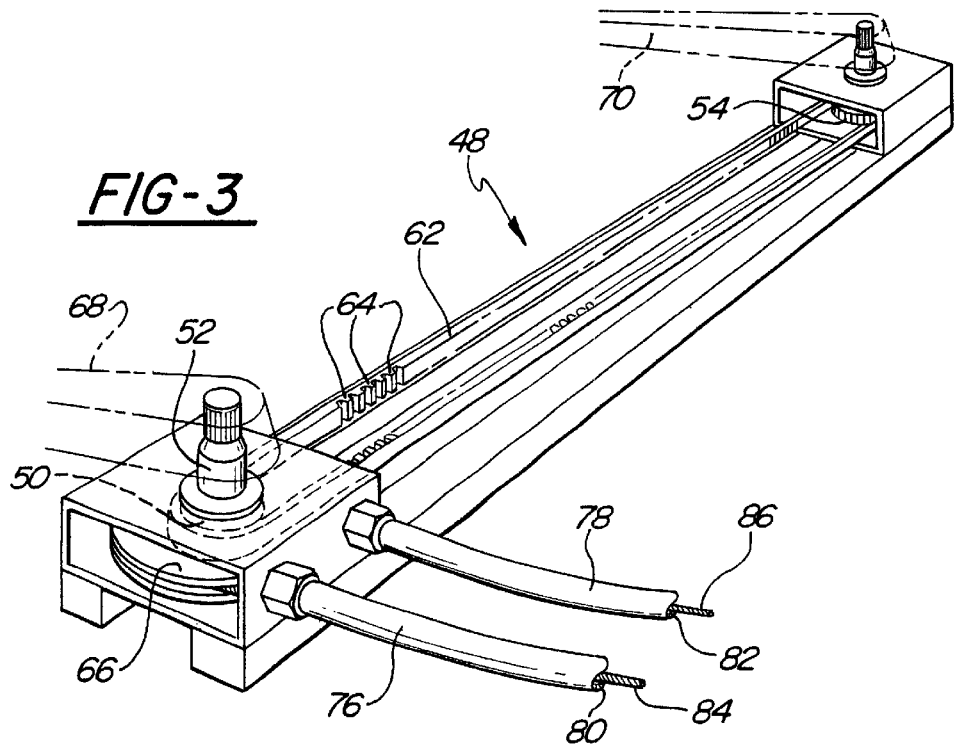
FIG. 3 is a partial view of the drive mechanism according to the first preferred embodiment.
Figure 4:
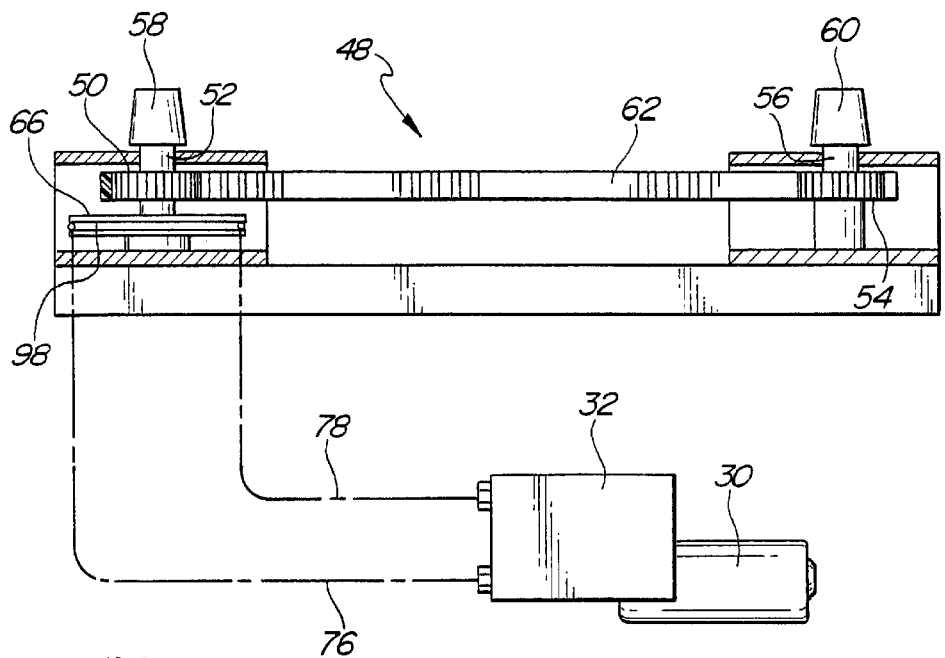
FIG. 4 is a view illustrating the drive mechanism rotated ninety degrees to a side view and in cutaway fashion.

Referring again to FIGS. 1 and 2, and also to FIGS. 3 and 4, a drive mechanism 48 is provided and includes a length, a width and a height. The drive mechanism is preferably of an elongate rectangular and three dimensional shape and is mounted proximate a lower edge of the vehicle windshield 18 and within the engine compartment 14.

The drive mechanism 48 further includes a first externally toothed gear 50 rotatably secured to a first pin 52 at a first end location. A second externally toothed gear 54 rotatably secured to a second pin 56 at a second end location. Each of the pins includes a capped end portion, at 58 for first pin 52 and at 60 for second pin 56 (see side view of FIG. 4). An elongate and closed loop timing belt 62 is provided having a toothed inner surface 64. The belt 62 mounts at opposite ends about the externally toothed gears 50 and 54 such that the continuous loop and toothed inner surface 64 interengages with the externally toothed gears. The belt 62 is typically constructed of a heavy-duty rubberized material, however it can also be produced with any other material exhibiting the necessary properties of flexibility and resiliency. The purpose of the belt is to drive the second toothed gear 54 in a precise and synchronized manner with respect to driven rotation of the first toothed gear 50 and as will be further explained. A circular disk 66 is likewise rotatably secured about the first pin 52 in a laterally spaced and generally coaxial fashion relative to the first toothed gear 50 (see specifically FIG. 4). The operation of the circular disk 66 will be further explained.

A first wiper arm 68 is pivotally secured to the first pin 52 of the drive mechanism at the first location and in a conventional manner and a second wiper arm 70 is likewise pivotally secured at a second location. Each of the first and second wiper arms 68 and 70 further includes an elongate wiper blade, see at 72 and 74, respectively in FIG. 1, and which overlays and contacts an exterior face of the windshield 18.

First and second elongated and internally hollowed sleeves 76 and 78 are provided and extend between a selected end location of the housing 32 and the drive mechanism 48. The sleeves 76 and 78 are preferably constructed of a steel conduit or like material exhibiting the necessary properties of strength and may further be either fixed or laterally flexible to some degree. The annular interior of the sleeves 76 and 78 may further be encapsulated with a nylon coating (see at 80 and 82 in FIG. 3) and for a purpose to now be described.

First and second flexible and incompressible cables 84 and 86 are encased within the first and second sleeves 76 and 78, respectively. The first and second cables 84 and 86 secure at selected outer radial locations 88 and 90 (see again FIG. 2) of the second and driven wheel 38 within the housing 32 and at first ends of the cables. An outer circumferential and channeled recess 92 is formed in said driven wheel 38 (see phantom designation of end portion of second cable 86 in FIG. 2) and guidingly receives therein the selected first end portions of the first and second cables 84 and 86 during reciprocal and driven rotation of said driven wheel 38. The cables 84 and 86 likewise secure to further selected radial locations 94 and 96 of the circular disk 66 in the drive mechanism (FIG. 2), the disk 66 likewise possessing an outer circumferential and channeled recess 98 (FIG. 4) formed thereabout and guidingly receiving selected end portions of the cables 84 and 86 during likewise reciprocal and driven rotation of the disk by the cables.

The advantage of the conduit sleeves 76 and 78 and encased cables 84 and 86 is that it permits the rotational driven force imparted to the driven wheel 38 to be imparted to the cables 84 and 86 which translate within the nylon coated sleeves 76 and 78. The cables 84 and 86 impart the translational and reciprocating force to the disk 66 mounted to the first pin 52 along with the first toothed gear 50. The gear 50 is thus made to rotate, along with the pin 52 and the attached first wiper arm 68, and the belt 62 causes the second toothed gear 52 and the attached second wiper arm 70 to likewise actuate in the desired and synchronized fashion.

Figure 5:
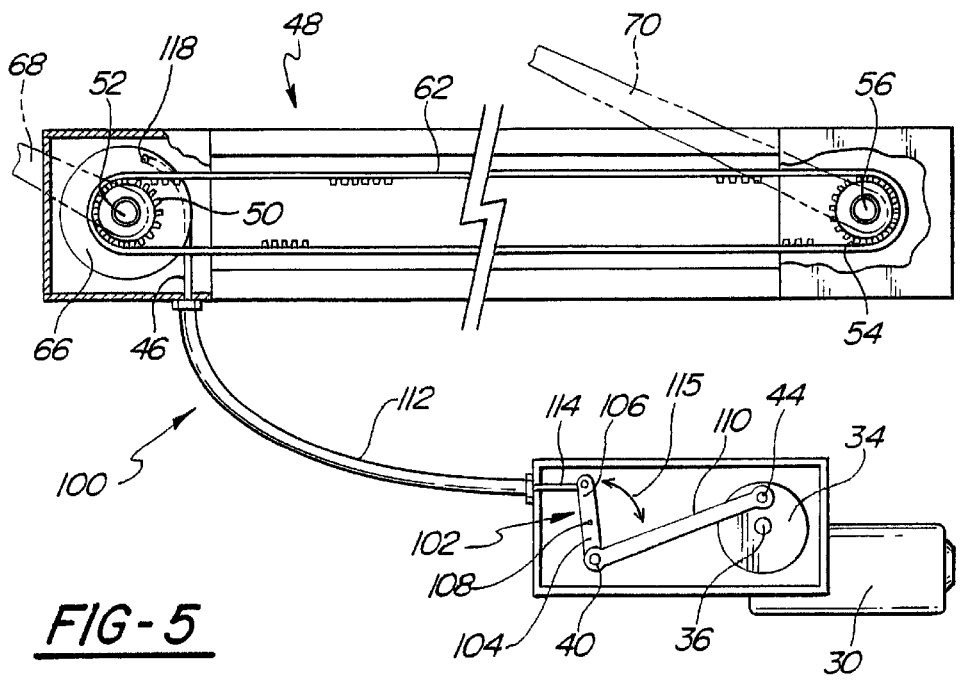
FIG. 5 is a view similar to that shown in FIG. 2 and illustrating windshield wiper assembly according to a second preferred embodiment in which a single sleeve and cable member actuates the drive mechanism.

Referring finally to FIG. 5, a view similar to FIG. 2 is shown of a windshield wiper assembly 100 according to a second preferred embodiment. The embodiment of FIG. 5 is largely similar to that shown in FIGS. 1–4, with the exception of the following particular description.

The driven member in FIG. 5 substitutes the driven wheel 38 with an elongate plate 102 having a first end 104 and a second end 106, the ends extending from opposite sides of second shaft 108, which again rotates about an axis parallel and spaced from the first shaft 36 corresponding to the driving wheel 34. A linkage member 110 secures to the driving wheel 34 in an outer radial and rotating fashion, as shown at 44 and just as in the first preferred embodiment. Likewise, the linkage member 110 secures to the second end 106 of the elongate plate 102 on a side opposite the second shaft 108.

A single elongated and internally hollowed sleeve or conduit 112 is employed in the variant of FIG. 5, connected at one end to the motor and drive housing and at the other to the drive mechanism for the wiper arms. A single flexible and incompressible cable is provided and is received within the hollow interior of the conduit 112. The cable connects to the drive housing at a first end 114 (securing to the second end 106 of the elongate plate 102) and to the drive mechanism at a second end 116 (which secures to an outer radial location 118 of the disk 66 just as shown by the first and second cables of the first preferred embodiment) and is capable of being slidingly translated as a result of pivoting actuation of the elongate plate 102, in the directions indicated by arrow 115.

Having described our invention, it will become apparent that it teaches a novel and unique windshield wiper assembly which provides for precise and synchronous actuation of the wiper arms and which also permits the positioning of the electrical motor and drive housing at a location remote from the drive mechanism. Additional embodiments will become apparent to those skilled in the art to which it pertains and without deviating from the scope of the appended claims.

What is claimed is:

1. A windshield wiper assembly for use in a motor vehicle, the vehicle including an engine compartment which is capable of generating an on-board electrical power supply, an occupant compartment, and a windshield extending upwardly from a location contiguous a firewall separating the engine compartment and the occupant compartment, said wiper assembly comprising:

an electric motor operatively connected to and powered by the on-board electrical supply, said motor forming a part of a housing mounted within the engine compartment at a location remote from the windshield, said housing including a conversion means for converting an output of said motor into a reciprocating and translating driving force;

said assembly further including a drive mechanism mounted proximate a lower edge of the windshield, a first wiper arm pivotally securing to said drive mechanism at a first location and a second wiper arm likewise pivotally securing to said drive mechanism at a second location, each of said first and second wiper arms further including an elongate wiper blade which overlays and contacts an exterior face of the windshield;

said drive mechanism including actuating means for driving said first and second wiper arms in a synchronized manner; said drive mechanism further comprising:

an elongate body having a length, a width and a height;

a first externally toothed gear rotatable secured to a first pin at said first location and a second externally toothed gear rotatable secured to a second pin at said second location, a circular disk being likewise rotatably secured to said first pin and engageable by said at least one cable, an outer circumferential and channeled recess being formed in said disk and guidingly receiving therein a selected end portion of said cable during reciprocal and driven rotation of said selected ends of said first and second wiper arms opposite said wiper blades securing to upper extending ends of said first and second pins, respectively; and an elongate and closed loop timing belt having a toothed inner surface, said belt mounting at opposite ends about said externally toothed gears such that said toothed inner surface interengages with said externally toothed gears; and at least one elongated and internally hollowed sleeve extending between said housing, and said drive mechanism , said sleeve enclosing a flexible and incompressible cable securing to said conversion means of said housing at a first end and to said actuating means of said drive mechanism at a second end;

said cable being acted upon by said conversion means and imparting said reciprocating and translating driving force to said drive mechanism to operate said wiper arms and blades.

2. The windshield wiper according to claim 1, said conversion means further comprising:

a driving wheel operatively connected to said motor and rotatable about a first shaft;

a driven member rotatably mounted to said housing about a second shaft a spaced location from said driving wheel, said second shaft defining an axis of rotation parallel to an axis of rotation defined by said first shaft; and an elongate linkage member rotatably mounted to an outer radial location of said driving wheel at a first end and to said driven member at a second end.

3. The windshield wiper assembly according to claim 2, said driven member further comprising a second wheel, said linkage member mounting to an outer radial location of said driven wheel.

4. The windshield wiper assembly according to claim 3, further comprising first and second elongated and internally hollowed sleeves extending between said housing and said drive mechanism, first and second flexible and incompressible cables being enclosed within said first and second sleeves, respectively.

5. The windshield wiper assembly according to claim 4, further comprising said first and second cables securing to selected outer radial locations of said second wheel, an outer circumferential and channeled recess being formed in said second wheel and guidingly receiving therein selected first end portions of said first and second cables during reciprocal and driven rotation of said second wheel, said cables securing to said disk in said drive mechanism at said second ends such that said outer circumferential and channeled recess of said disk guidingly receives therein selected end portions of said cable during reciprocal and driven rotation of said disk.

6. The windshield wiper assembly according to claim 2, said driven member further comprising an elongate plate having first and second selected ends extending opposite said second shaft, said linkage member mounting in pivotal fashion to said first selected end of said plate.

7. The windshield wiper assembly according to claim 6, further comprising said first end of said cable securing to said second selected end of said elongate plate.

8. The windshield wiper assembly according to claim 1, said housing capable of being secured to a location along the vehicle firewall.

9. The windshield wiper assembly according to claim 1, the vehicle engine compartment further being defined by first and second side walls, said housing capable of being secured to a location along one of the side walls.

10. The windshield wiper assembly according to claim 1, said at least one elongated sleeve being constructed of a steel conduit and encapsulated with nylon for slidingly receiving said cable.

11. A windshield wiper assembly for use in a motor vehicle, comprising:

an electric motor forming a part of a housing mounted at a first location within the vehicle, said housing converting an output of said motor into a reciprocating and translating driving force;

a drive mechanism mounted at a second location within the vehicle, said drive mechanism including first and second windshield wiper arms secured at first and second locations to first and second gears, said drive mechanism further comprising an elongate and closed loop timing belt which is mounted at opposite ends about said first and second gears for synchronously actuating said first and second wiper arms; and an elongate conduit extending between said housing and said drive mechanism said elongate conduit further including an internally hollowed sleeve within which is slidably and reciprocally secured an incompressible cable for transferring said reciprocating and translating driving force from said housing to said drive mechanism.

* * * * *